Nov. 23, 1937. P. RUFFINO 2,100,174
BRAKE
Filed March 22, 1935
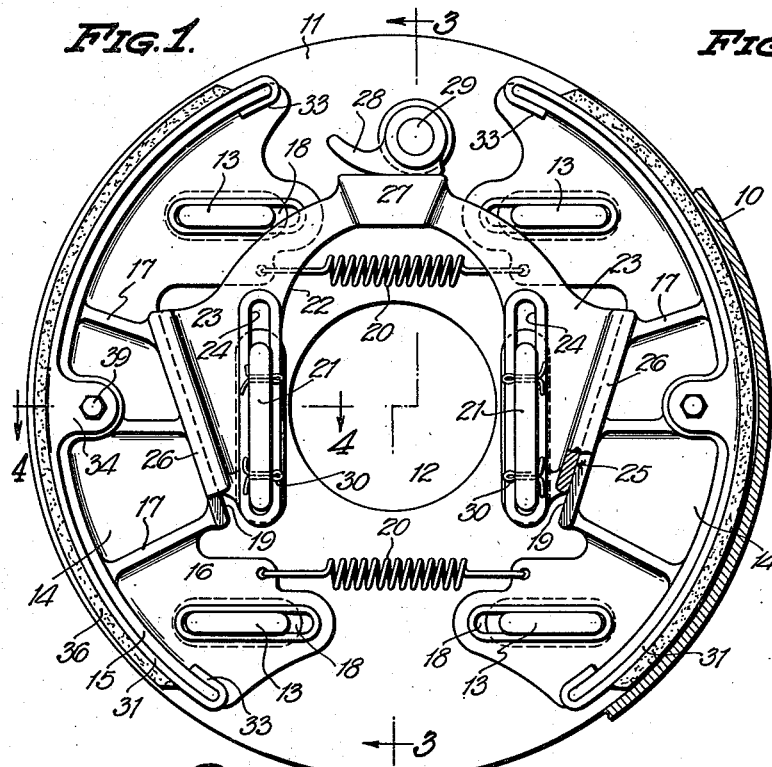
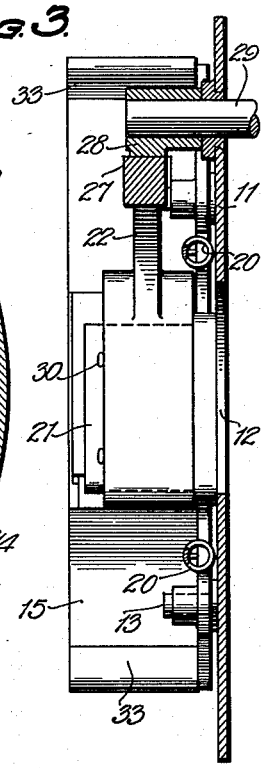
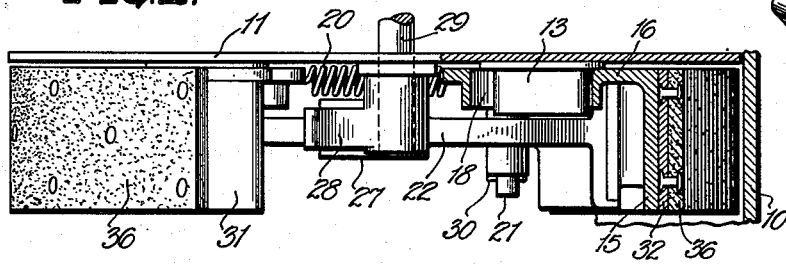
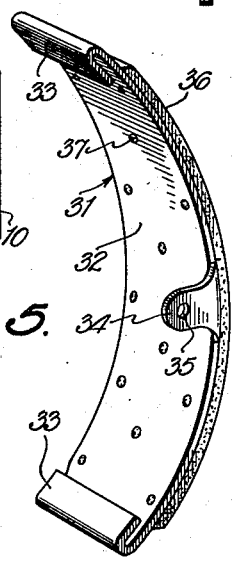
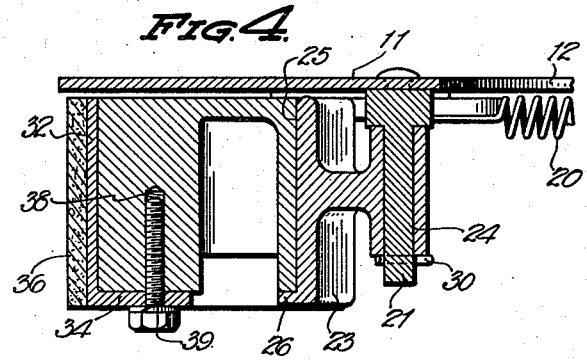
INVENTOR.
PETER RUFFINO.
BY
ATTORNEYS.

Patented Nov. 23, 1937

2,100,174

UNITED STATES PATENT OFFICE 2,100,174

BRAKE

Peter Ruffino, Brooklyn, N. Y.

Application March 22, 1935, Serial No. 12,345

6 Claims. (Cl. 188—78)

This invention relates to improvements in brakes, and more particularly to brake mechanisms for automobiles.

One of the main objects of the invention resides in a brake mechanism embodying a pair of slidable diametrically opposed brake shoes adapted to be expanded by wedge means into braking contact with the brake drum of a wheel, the wedge means being of such construction as to effect a positive diametrical expansion of the brake shoes to cause an even pressure throughout the length thereof to obtain maximum braking efficiency and an even wear upon the brake lining.

A further feature of the invention is the provision of a simple and inexpensive construction of brakes wherein the parts are readily accessible for repair or replacement purposes.

With these and other objects in view, the invention resides in the certain novel construction, combination and arrangement of parts, the essential features of which are hereinafter fully described in the specification, are particularly pointed out in the appended claims, and are illustrated in the accompanying drawing, in which:

Figure 1 is a side elevational view partly in section of my improved brake mechanism.

Figure 2 is a top plan view with parts in horizontal section.

Figure 3 is a vertical sectional view on the line 3—3 of Figure 1.

Figure 4 is an enlarged horizontal sectional view on the line 4—4 of Figure 1.

Figure 5 is a perspective view of one of the brake lining units per se.

Referring to the drawing by reference characters, the numeral 10 designates a portion of the brake drum of an automobile which is adapted to be fixedly attached to the wheel for rotation therewith, while closing the open side of the drum 10 is a flat disk-like anchor plate 11 which is adapted to be fixedly secured to the axle housing of an automobile. The center of the plate 11 is provided with an opening 12 for the passage of the axle.

Extending inwardly from the plate 11 on opposite sides of the vertical axis thereof are sets of upper and lower elongated posts 13, the same being horizontally disposed. The respective sets of posts 13 slidably support diametrically opposed brake shoes 14, and in view of the fact that the brake shoes 14 are identical in construction, a description of one will suffice for the other.

Each brake shoe 14 includes an arcuate shaped flange 15 from which an angular flange or web 16 extends, the said web extending inwardly from the inner edge of the arcuate flange 15 and is reinforced by transversely disposed ribs 17. The web 16 is provided with upper and lower elongated slots 18, of a length greater than the guide post 13 and which receives the respective posts 13 whereby the brake shoe is slidably supported for movement horizontally to an expanded or retracted position. The web 16 centrally thereof is provided with a downwardly and inwardly inclined face 19 of a width slightly less than the width of the arcuate flange 15.

From the description thus far, it will be seen that the two brake shoes 14—14 when slidably supported upon the guide posts 13 are diametrically opposed and they are normally urged to a retracted position by springs 20, the ends of which respectively connect with the webs 16 of the respective brake shoes. The elongated guide posts 13 serve to limit the sliding movement of the brake shoes both to retracted and expanded position.

Fixed to and extending inwardly from the anchor plate 11 are spaced parallel elongated guide posts 21—21, the said posts being respectively disposed on opposite sides of the opening 12. Slidable on the posts 21 is an expanding wedge member 22, the said member 22 being of substantially yoke or inverted U-shape as shown in Figure 1, the legs 23 of which are provided with vertical elongated slots 24 for receiving the elongated post 21. The outer sides of the legs 23 are enlarged in thickness and are provided with downwardly and inwardly extending wedge surfaces 25 for respective engagement with the wedge surfaces 19 of the brake shoes. The wedge portions of the legs 23 are provided with an outside flange 26 for engaging the sides of the respective wedge surfaces 19 of the brake shoes. The intermediate or bight portion of the wedge member 22 is provided with a widened head 27, the top of which is flat and is engaged by a cam 28 fixedly secured to the inner end of a shaft 29 journaled in the anchor plate 11 and which shaft is adapted to be operatively connected with the brake actuating mechanism of an automobile (not shown). The wedge member 22 may be inserted into position by sliding the same over the post 21 and when in the position shown in Figure 1, cotter pins 30 are inserted transversely through openings provided in the post 21 for retaining the member 22 in position.

Each brake shoe 14 removably supports a brake lining unit 31, shown per se in Figure 5 of the drawing. Each brake lining unit 31 includes a metal arcuate shaped strip 32, the ends of which are turned inwardly to provide hook portions 33. The intermediate portion of the member 32 is formed with an inwardly extending ear 34 having an opening 35 therein for a purpose to be presently explained. Fixedly secured to the outside of the arcuate shaped member 32 is a layer of lining material 36, the same being fastened in position by rivets or like fastening elements 37. The ends of the lining material 36 terminate adjacent the hook ends 33 of the member 32.

The lining unit 31 is inserted laterally upon each of the brake shoes 14, the hook ends 33 engaging the ends of the arcuate flange 15 of the shoe, while the opening 35 in the ear 34 registers with a threaded opening 38 provided in the flange 16 while a threaded bolt 39 threads into the threaded opening 38 and secures the brake lining unit in position against lateral movement. The hook ends 33 serve to prevent creeping of the liner unit in a circumferential direction. It will be noted that when the lining material 36 becomes worn, the lining unit 31 may be removed by merely removing the bolt 39 and sliding the unit from the brake shoe, whereupon the worn unit may be replaced by a new one.

In the operation of the brake mechanism hereinbefore described, it will be observed that the springs 20—20 serve to normally hold the brake shoes in a retracted position, whereupon the wedge member 22 is in an up or raised position. In order to expand the brake shoes, the shaft 29 is turned by the brake operating mechanism and the cam 28 forces downwardly upon the head 27 of the member 22, causing the wedge faces 25 to wedgingly engage the wedge surfaces 19 on the brake shoes. This wedging action imparts outward sliding movement to the brake shoes 14 in opposite directions, thus causing the brake lining material 36 to frictionally engage the brake drum 10. Upon the release of the brake actuating mechanism, the springs 20 slide the brake shoes to a retracted position and force the wedge member 22 upwardly to its normal position.

By reason of the construction and arrangement of the parts herein shown and described, it will be appreciated that the mechanism may be readily assembled and that the parts are accessible for repair or replacement purposes. In fact, the brakes may be relined by the use of the brake lining units 31 without the aid of a skilled mechanic. Having thus described the invention, what I claim as new and desire to secure by Letters Patent of the United States, is:—

1. In a brake, a drum, a pair of horizontally opposed shoes slidably mounted relative to said drum, a vertically slidable yoke shaped wedge member intermediate said shoes, coacting wedge surfaces between the ends of said member and the inner mid portions of the respective shoes, spring means acting upon said shoes to move the same toward each other to retracted position, and actuating means engageable with the top of said yoke shaped member for sliding said member to cause the coacting wedge surfaces to expand said shoes against the tension of said spring means into braking engagement with said drum.

2. In a brake, a drum, an anchor plate, a pair of horizontally opposed brake shoes slidably supported upon said anchor plate, a yoke shaped wedge member slidably mounted upon said anchor plate for vertical movement and being interposed between said shoes, coacting inclined wedge surfaces on the ends of said yoke shaped wedge member and on the inner mid portions of the respective shoes, spring means acting to normally hold said shoes in a retracted position, and actuating means engageable with the top closed end of said yoke shaped wedge member for imparting a downward force upon said yoke shaped wedge member to cause the coacting wedge surfaces to expand said shoes into braking engagement with said drum against the tension of said spring means.

3. In a brake, a drum, an anchor plate, a pair of opposed brake shoes slidably mounted upon said anchor plate, reversely inclined wedge surfaces provided on mid portions of the respective shoes, a yoke shaped member slidably mounted on said anchor plate intermediate said shoes, and having correspondingly inclined wedge surfaces on opposite sides thereof in contacting engagement with the inclined surfaces on the respective shoes, spring means acting upon said shoes to normally hold the same in a retracted position, and actuating means engaging the bight portion of said yoke shaped member for sliding said member to wedge said shoes into braking engagement with said drum.

4. In a brake, a drum, an anchor plate, a pair of horizontally opposed brake shoes having inwardly extending webs, guide posts extending inwardly from said anchor plate and extending through elongated slots in the webs of said shoes, inwardly and downwardly inclined surfaces on the inner sides of the webs, a yoke shaped member intermediate said shoes having vertical slots in the legs thereof, posts extending from said anchor plate and passing through said vertical slots, downwardly and inwardly inclined surfaces on the outer sides of the legs of said member in wedging engagement with the respective inclined surfaces on the webs of said shoes, spring means acting upon said shoes to normally hold the same in a retracted position, and actuating means engaging the bight portion of said yoke shaped member to impart a downward sliding movement thereto against the tension of said spring means to wedgingly move said shoes to expanded position into engagement with said drum.

5. In a brake, a drum, an anchor plate, a pair of horizontally slidable opposed brake shoes having inwardly extending webs, inwardly and downwardly inclined surfaces provided on the inner mid portions of said webs, a yoke shaped member slidably supported by said anchor plate for vertical sliding movement, said yoke shaped member being disposed intermediate said shoes, downwardly and inwardly inclined surfaces on the outer sides of the legs of said yoke shaped member in contacting wedging engagement with the respective inclined surfaces of the webs of said shoes, spring means acting upon said shoes to normally hold the same in a retracted position, and actuating means directly engaging the outer side of the bight portion of said yoke shaped member to impart a downward sliding movement thereto against the tension of said spring means to wedgingly move said shoes to expanded position into engagement with said drum.

6. In a brake, a drum, an anchor plate, a pair of horizontally opposed brake shoes slidably supported upon said anchor plate, a yoke shaped wedge member slidably mounted upon said anchor plate for vertical movement and being interposed between said shoes, coacting wedge means between the legs of said yoke shaped member and the inner mid portions of the respective shoes, spring means acting upon said shoes to move the same toward each other to retracted position, a flat surface provided on the top of the bight portion of said yoke shaped member, and a cam journaled for turning movement in said anchor plate and in bearing contact with said flat surface, whereby turning of said cam will impart a downward movement to said yoke shaped member to cause the coacting wedge surfaces to expand said shoes against the tension of said spring means and into braking engagement with said drum.

PETER RUFFINO.